United States Patent
Böhme et al.

(10) Patent No.: US 6,405,184 B1
(45) Date of Patent: Jun. 11, 2002

(54) PROCESS FOR PRODUCING FAULT CLASSIFICATION SIGNALS

(75) Inventors: Klaus Böhme; Andreas Jurisch, both of Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/155,375

(22) PCT Filed: Mar. 25, 1997

(86) PCT No.: PCT/DE97/00682

§ 371 (c)(1),
(2), (4) Date: Mar. 1, 1999

(87) PCT Pub. No.: WO97/36185

PCT Pub. Date: Oct. 2, 1997

(30) Foreign Application Priority Data

Mar. 25, 1996 (DE) .......................... 196 13 012

(51) Int. Cl.$^7$ .............................. G06F 15/18; G06G 7/00
(52) U.S. Cl. .............................. 706/20; 706/38; 706/42; 706/34
(58) Field of Search .............................. 706/20, 38, 42, 706/34

(56) References Cited

U.S. PATENT DOCUMENTS 5,377,201 A * 12/1994 Chakradhar et al. ........ 714/741

FOREIGN PATENT DOCUMENTS

| DE | 43 33 257 | 3/1995 |
| DE | 43 33 258 | 3/1995 |
| DE | 43 33 259 | 5/1995 |
| DE | 195 45 267.4 | 11/1995 |
| DE | 44 33 406 | 12/1995 |

OTHER PUBLICATIONS

K. Böhme, et al., "Optimierung von Distanzschutz–algorithmen mit Hilfe neuronaler Netze," 47 Elektrie, pp. 2–10, Jan. 1, 1993*.

Thomas Dalstein et al., "Neural Network Appraoch To Fault Classification For High Speed Protective Relaying," 10 IEEE Transactions on Power Delivery, No. 2, pp. 1002–1011,Apr. 1995.

Eberhard Schöneburg, "Industrielle Anwendung Neuronalar Netze," pp. 43–56, 234–326, 1993**.

Siemens–Gerätehandbuch, "Digitaler Abzweigschutz 7SA511 V3.0," No. C53000–G1100–C98–1,1995**.

Thomas Dalstein, "Einsatz Neuronaler Netze im Distanzschutz," 21 Electrotechnik No. 173, pp. 44–77, 1995**.

Cho et al, "An ANN Based Approach to Improve the speed of a differential Equation Based Distance Relay Algorithm" IEEE Transaction on power Delivery, Apr. 1999.*

* cited by examiner

Primary Examiner—George B. Davis
(74) Attorney, Agent, or Firm—Kenyon & Kenyon

(57) ABSTRACT

A method for generating fault classification signals which identify faulty loops which develop in a multiphase energy supply network observed in the event of a fault from a protective device with a starting arrangement. To be able to generate such fault classification signals in a relatively simple manner, a neural network is used which is trained using input variables simulating faulty loops in the form of normalized resistance and reactance variables formed taking into consideration the starting characteristic of the starting arrangement. In the case of a fault, normalized resistance and reactance measured variables network for generating fault classification signals.

2 Claims, 2 Drawing Sheets

PROCESS FOR PRODUCING FAULT CLASSIFICATION SIGNALS

BACKGROUND INFORMATION

A method for obtaining fault classification signals characterizing faulty loops in a multiphase electric energy supply network is described in the Siemens device manual "Digitaler Abzweigschutz (Digital Feeder Protection) 7SA511 V3.0," Order No. C53000-G1100-C98-1, 1995, page 36. In this conventional method, impedance starting occurs in the form of a loop-related starting process. In this process, following the execution of an initial process step for ground fault detection in the case of at least one detected ground fault, the conductor-ground loop, and in the case of no detected ground fault, the conductor-conductor loop, are monitored. A loop is considered started if the corresponding measured impedance vector is within the starting polygon for the particular loop. If several loops are started at the same time, an impedance comparison is made in which only loops whose impedance is no more than 1.5 times the smallest loop impedance are classified as started.

In a method for obtaining fault classification signals characterizing faulty loops described in a relatively old German Patent Application No. P 195 45 267.4, in order to eliminate with a great degree of certainty all of the loops which despite initial starting actually are not faulty, the actual faulty loops are determined through comparison of virtual impedances calculated with respect to the measured conductor-conductor loops, by absolute value and phase, with the impedances determined upon impedance starting if only loops without ground faults are found. If at least one loop with ground fault is found, faultless conductor-ground loops are recognized and eliminated through a comparison of the absolute values of the virtual impedance values formed from the impedance values of the conductor-ground loops detected as faulty with the smallest virtual impedance value formed from the impedance values of the fault-free conductor-ground loops. For further processing of the impedance values of the other, non-eliminated, perceived-as-faulty loops, variously configured test procedures are used in view of the number of simultaneously detected conductor-ground loops. Among such test procedures, the particular test procedure assigned to the particular number of conductor-ground loops detected is conducted.

The dissertation "Einsatz neuronaler Netze im Distanzschutz" (Use of Neural Networks in Impedance Protection], pages 71 through 76 by T. Dalstein, published in "Fortschritt-Berichte VDI" [VDI Progress Reports), Series 21: Elektrotechnik, No. 173, decribes the use of neural networks for the generation of fault classification signals. This network is trained by applying to it sampling values of current and voltage simulated for at least 50,000 malfunctions. The training must be performed individually for the particular installation site in an energy supply system, making manufacturing costs for a protective device equipped with such a neural network extremely high so that it cannot be considered for application in practice. A starting arrangement is assigned to the neural network.

SUMMARY OF THE INVENTION

The present invention relates to a method for generating fault classification signals which designate fault loops in a multiphase energy supply system which form in the case of a fault observed from a protective device with a starting arrangement in which a neural network is used which is trained with input values simulating faulty loops, and in which, in the event of faults, measured values derived from currents and voltages of the loops of the energy supply system are applied to the neural network at its inputs for the generation of fault classification signals in order to receive the fault classification signals at its outputs.

An object of the present invention is to further develop a method which can be carried out at a relatively low cost and therefore can be applied in practice.

To achieve this object according to the present invention, a neural network is used which is trained with input variables simulating faulty loops in the form of normalized resistance and reactance variables formed with consideration of the starting characteristic of the starting arrangement. For the purpose of generation of the fault classification signals in the event of a fault, resistance and reactance measured variables of the loops normalized taking into consideration the starting characteristic are applied to the neural network trained in such manner.

A method for obtaining a fault-identifying signal through a neural network arrangement is described in German Patent No. 43 33 257. In this method, normalized voltage values are supplied to the neural arrangement. A fault-identifying signal is generated with which it is possible to distinguish between a short circuit with arcing and a metallic short circuit. In addition, normalization of the voltage values apparently takes place in the conventional manner and not taking into consideration a starter characteristic of normalized resistance and reactance measured variables which in the method according to the invention is absolutely necessary for a suitable training process of the neural network arrangement.

The same also applies with respect to the use of normalized sampling signals with respect to an additional method described in German Patent No. 43 33 260. In this method, in contrast to the above described method and the method according to the present invention, a starting signal can be obtained in a selective protection arrangement.

An impedance protection device which contains a neural network arrangement as an essential component is described in German Patent No. 44 33 406. This arrangement has a separate neural network for each possible fault type on the monitored section of an energy supply network. Assigned to the neural network arrangement is a fault type identification device which is connected to the input of a device for the extraction of features. On the output side, this device is connected to contact devices which correspond in number to the possible fault types. The outputs of all contact devices are brought to a common output at which, in the event of a fault of a certain type in the monitored section, an output signal of the neural network occurs as a result of the corresponding contact device being triggered, such output signal being provided for detection of this specific fault.

A method for the generation of signals which identify the type of a fault with respect to single-pole faults to ground, bipolar faults with ground contact, bipolar faults without ground contact, and three-pole faults with or without ground contact is described in German Patent No. 43 33 258. Thus fault classification signals which identify faulty loops formed in the case of a fault are not generated. In this conventional method, a single neural network with several neurons in its output layer is used which is trained with current and voltage values normalized in a conventional manner so that in the event of a fault of a certain type, a particular neuron of the output layer transmits an output signal.

The book "Industrielle Anwendung Neuronaler Netze" (Industrial Application of Neural Networks) by E.

Schoneburg, 1993, pages 51 and 324, decribes a system in which the measurement—in the framework of a gear unit diagnosis with neural networks—of all upshifts of the gear unit is investigated with a neural network in which the various response times and slip times are normalized.

German Patent No. 43 33 259 describes a method for generating a direction signal which indicates the direction of a short-circuit current. The direction signal indicates whether a short circuit occurred in a first or a second direction from the measuring point. A neural network is used for generating the direction signal. The neural network receives neurons on which subtraction values are used. The direction signal is formed using normalized sampling values of the currents. The neural network is trained accordingly. The normalized sampling values are formed in a normalizing component in the conventional manner, taking the specified current value into account.

The periodical "ELEKTRIC," 47 (1993) 1, pp. 2–10, describes the use or neural networks in impedance protective devices with which the position of a fault in an energy supply network can be determined. Such devices in general do not begin measuring activity until after a fault classification signal is generated by an assigned starting arrangement in the event of a fault. Such a fault classification signal is not described in the periodical. Nevertheless, in the conventional device, normalized values are processed. The imaginary part of the impedance is normalized to 100% of the line strength.

An advantage of the method according to the present invention is that it can be carried out with a neural network which is uniformly trained for use at different sites of energy supply systems so that the neural network which has been trained once can be "copied" for different application purposes. This is attributable to the fact that in the method according to the present invention, the training of the neural network does not take place with respect to currents and voltages developing in the event of faults, which simulate faulty loops but rather with normalized resistance and reactance values, simulating faulty loops. In practical application, normalized resistance and reactance measured variables must be formed in the framework of the method according to the present invention with respect to the particular starting characteristic of the starting arrangement from the particular resistance and reactance measured variables determined, after which the normalized resistance and reactance measured variables are applied to the neural network. By taking into consideration the particular starting characteristic or the particular starting polygon during the formation of the normalized resistance and reactance measured variables of the loops, an adjustment is thus made, in the method according to the present invention, to differing situations at the particular installation site in the particular energy supply system. A further advantage of the method according to the present invention is that on the basis of the use of the appropriately trained neural network, the advantageous possibility of being able to unambiguously distinguish faulty loops from loops which are not actually faulty even in a difficult borderline situation is provided.

In an alternative advantageous embodiment of the method according to the present invention, a neural network is used which has been trained with input variables simulating faulty loops in the form of resistance and reactance variables of the loops and the position of these variables in relation to the classifying signals which describe the starting characteristic. Resistance and reactance variables of the loops and discrimination signals describing the position of these variables with respect to the particular starting characteristic signals are applied to the neural network trained in this manner for the purpose of generating fault classification signals in the event of a fault.

This embodiment of the method according to the present invention is also based on the neural network being trained using input variables which have to a certain degree been normalized in that in this embodiment the training of the neural network is accomplished not only using input variables simulating faulty loops in the form of resistance and reactance variables of the loops but rather in addition, taking into consideration classifying signals which describe the position of these variables with respect to the starting characteristic of the starting arrangement. By this means, this embodiment of the method according to the present invention also can be readily employed independently of the particular network conditions at different locations of energy supply systems in that only adaptation to the particular circumstances is made through the discrimination signals generated with respect to the particular starting characteristic of the starting arrangement.

DETAILED DESCRIPTION

Figure 1:
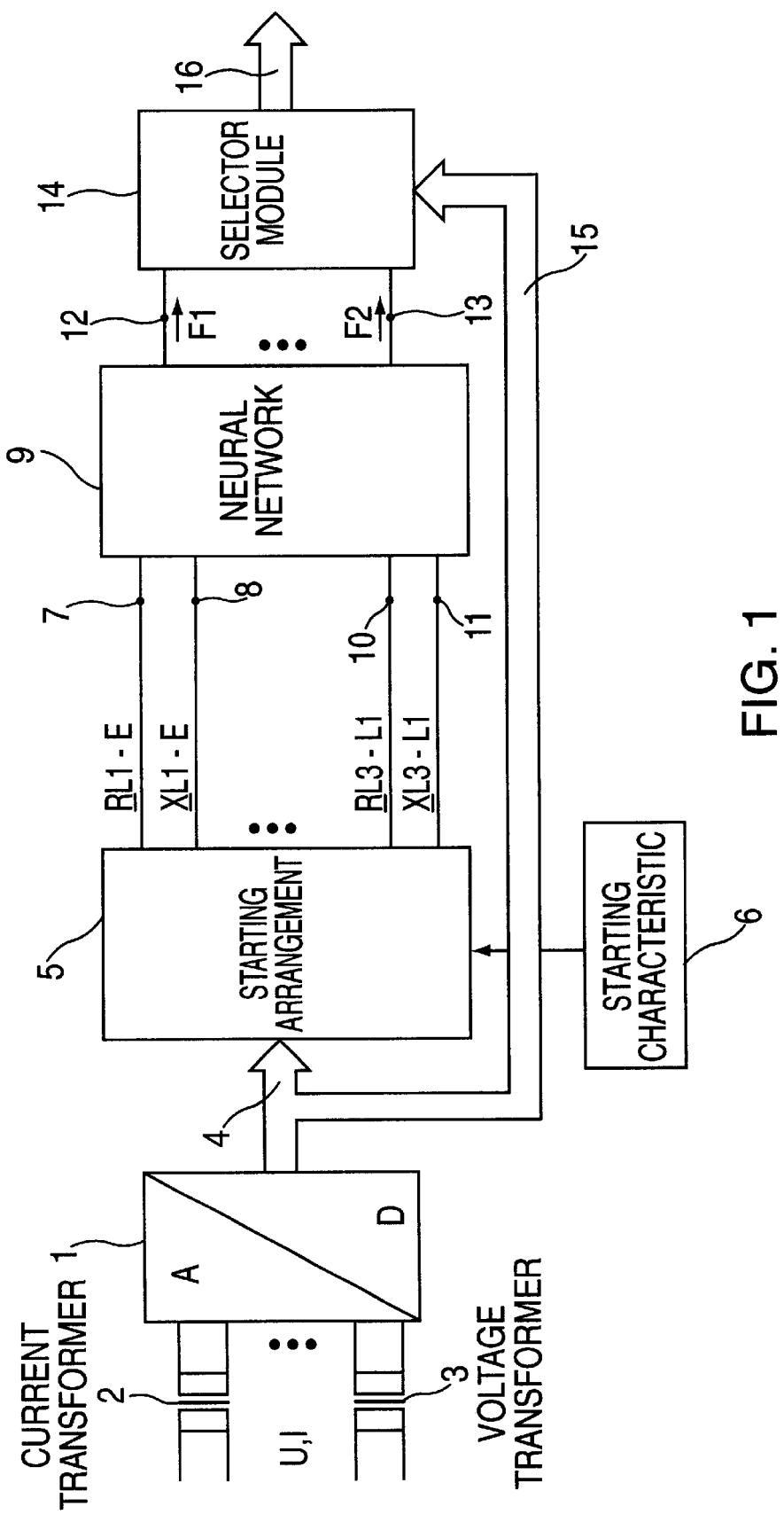
FIG. 1 shows exemplary embodiment of an arrangement for performing the method according to the present invention having a neural network trained with normalized resistance and reactance variables.

FIG. 1 shows an analog-digital converter 1 which receives currents I proportional to the currents in the conductors of a multiphase energy supply system (not illustrated) across current transformer 2 and voltages proportional to the voltages U on the conductors are applied across voltage transformer 3. Analog-digital converter 1 is connected via data bus 4 on the output side to a starting arrangement 5 which can be configured in the form of impedance starting and thus forms impedances for each conductor loop from the currents and voltages of the two conductors involved and monitors the particular impedance vector formed with respect to whether it lies within the starting characteristic. Starting arrangement 5 is also provided with a device 6 for setting the parameters of the starting characteristic of starting arrangement 5.

In starting arrangement 5, loops which develop in the event of a fault are measured with respect to the installation site of the arrangement so that a resistance measured variable, for example RL1-E, and a reactance measured variable XL1-E, are obtained from the current assigned to each loop and from the respective voltage if the fault event is a short circuit between a conductor L1 (not shown) of a multiphase energy supply line (also not shown) and ground E, a conductor-ground-loop thus being formed by the fault. The resistance and reactance measured variables obtained in such manner are normalized with respect to the starting characteristic defined by device 6 and the defined starting polygon by forming normalized resistance and reactance measured variables RL1-E and XL1-E with respect to the starting characteristic through formation of quotients. These normalized resistance and reactance variables are supplied to inputs 7 and 8 of a neural network 9 to which corresponding additional resistance and reactance measured variables can be applied via corresponding additional inputs assigned to each possible loop; it is additionally shown only by way of example that a normalized resistance measured variable RL3-L1 and an additional normalized reactance variable XL3-L1 can be applied to additional inputs 10 and 11 of the neural network 9 if a fault has occurred between conductors L3 and L1 of the multiphase energy supply line (not shown). At each input 7,8 and 10,11 and additional inputs of neural network 9, there is an input neuron of neural network 9 which can be configured as a multilayered neural network. Neural network 9 has a series of outputs of which only outputs 12 and 13 are depicted in FIG. 1. The number of outputs is determined by the number of loops which are to be recognized with the help of neural network 9 with respect to the particular energy supply line as faulty. The outputs of neural network 9 represent outputs of particular output neurons of neural network 9. A fault classification signal F1 occurs at output 12 if a fault has occurred between conductor L1 and ground E, while, for example, a signal F2 occurs at output 13 if a fault has occurred between conductors L3 and L1 of the energy supply line.

A selector module 14 is connected to outputs 12 and 13 of neural network 9, and the input of the selector module is connected to a data bus 15 at the output of analog-digital converter 1. Corresponding to the signals at outputs 12 and 13 of neural network 9, the measured variables at the output of coverter 1 which are assigned to the faulty loops are supplied from selector module 14 to a protective device (not shown), for example an impedance protection device, arranged downstream from selector module 14 via an output data bus 16, whereupon the protective device activates circuit breakers which are a part of the energy supply line.

It is essential for the operation of the arrangement according to FIG. 1 that neural network 9 be trained so that it will generate fault classification signals F1 and F2 at outputs 12 and 13 from the normalized resistance and reactance measured variables supplied to it, for example RL1-E and XL1-E and RL3-L1 and XL3-L1 at inputs 7 and 8, as well as 10 and 11. This is achieved through neural network 9 having been trained using normalized resistance and reactance variables with which faulty loops are simulated. Consideration of the starting characteristic of the starting arrangement in the formation of normalized resistance and reactance variables, neural network 9 can be applied independently of the particular application location if normalized resistance and reactance measured variables are supplied to it on the input side in the particular application situation. This is ensured through device 6, which enables starting arrangement 5, preferably configured in the form of a computer, to form the normalized resistance and reactance measured variables which neural network 9 recognizes on the basis of its training and with which it generates fault classification signals, including F1 and F2, in a targeted and reliable manner.

Figure 2:
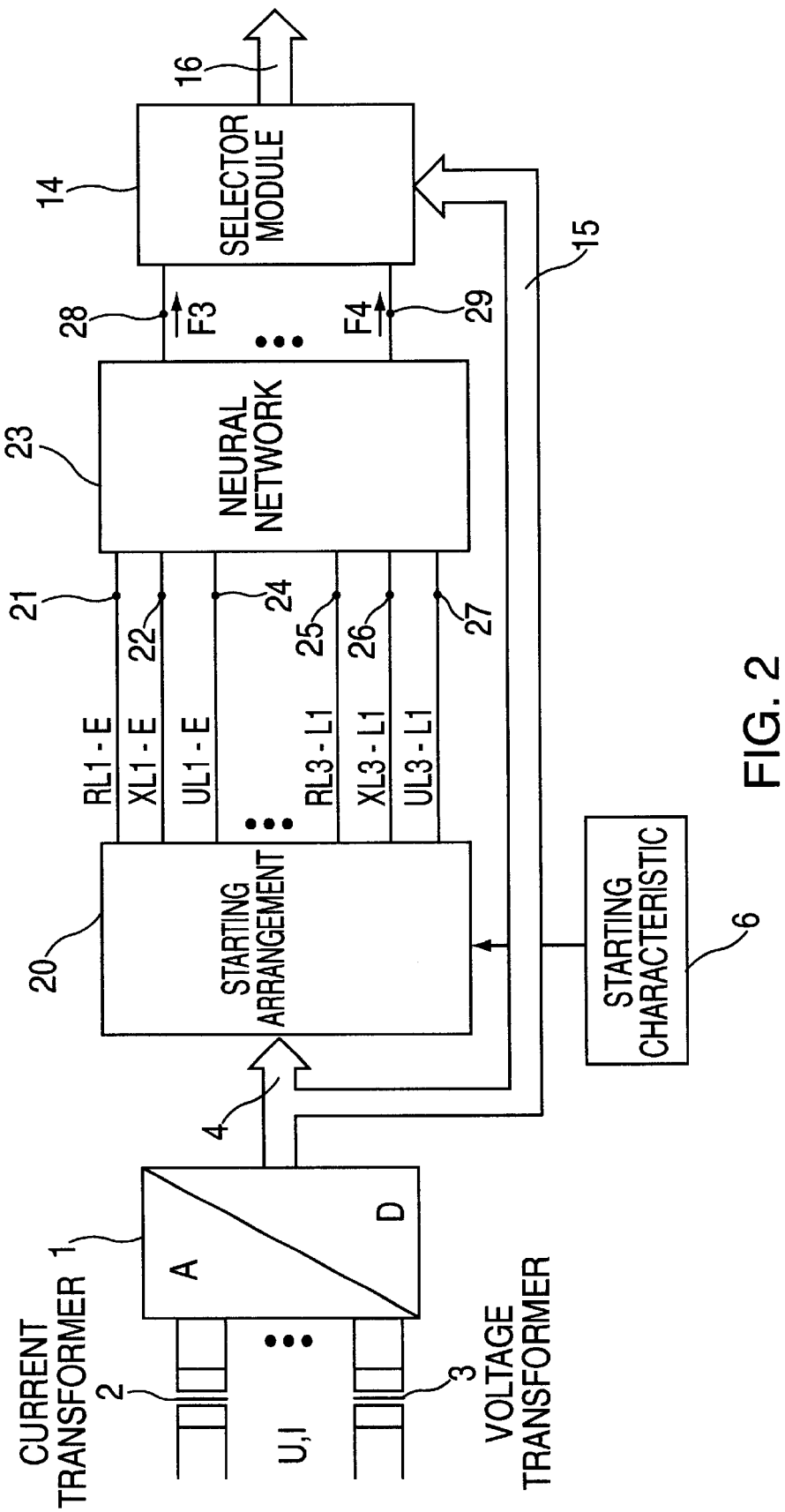
FIG. 2 shows exemplary embodiment of an arrangement for performing the method according to the present invention having a neural network trained with resistance and reactance variables taking discrimination signals into consideration.

In the arrangement according to FIG. 2, like components are supplied with the same reference numbers. Starting arrangement 20 is here configured differently since it produces at its outputs unnormalized resistance and reactance measured values RL1-E, XL1-E and RL3-L1, XL3-L1, i.e., measured values which can be calculated from currents and voltages of the particular loops. The unnormalized resistance and reactance measured values RL1-E and XL1-E are supplied to inputs 21 and 22 of a neural network 23. In addition, a discrimination signal UL1-E from starting arrangement 20 is supplied to an additional input 24 of neural network 23. This discrimination signal UL1-E indicates whether the assigned resistance and reactance measured variables RL1-E and XL1-E describe a vector which lies within the starting characteristic or starting polygon defined by device 6. Accordingly, for example, an unnormalized reactance measured value RL3-L1 and XL3-L1 is connected to additional inputs 25 and 26 of neural network 23 as well as a discriminating signal UL3-L1 to an additional assigned input 27, the discriminating signal also indicating in this case whether the above measured values describe a vector within the starting characteristic or within the starting polygon. At outputs 28 and 29, for example, of neural network 23, fault classification signals F3 and F4 are then emitted which, for example, identify the loop L1-E of the energy supply line (not shown) as a faulty loop and loop L3-L1 as an additional faulty loop.

Neural network 23 is trained in a different manner than neural network 9 according to FIG. 1. Specifically, neural network 23 is trained using resistance and reactance variables taking into consideration classifying signals which indicate in a particular case whether the variables supplied in pairs describe a vector lying within the starting characteristic or outside of the starting characteristic. In this way normalization is performed so that the arrangement according to FIG. 2 will function properly at different installation sites in a network and will supply via a selector module 14 according to FIG. 1 a protective device (not shown), in particular an impedance protective device, with the measured variables which must be evaluated in a particular fault situation.

What is claimed:

1. A method for generating fault classification signals identifying fault loops in a multiphase energy supply system formed in a case of a fault observed from a protective device, the protective device including a starting arrangement, comprising the steps of:

training a neural network using input variables simulating faulty loops, the input variables including normalized resistance and reactance variables formed as a function a starting characteristic of the starting arrangement;

deriving measured values from currents and voltages of the loops of the energy supply system;

normalizing the measured values as a function of the starting characteristic;

in the event of a fault, applying the normalized measured values to the neural network; and generating by the trained neural network the fault classification signals as a function of the normalized measured values.

2. A method of generating fault classification signals designating fault loops in a multiphase energy supply system which form in a case of a fault observed from a protective device, the protective device including a starting arrangement, comprising the steps of:

training a neural network using input variables simulating faulty loops, the input variables including resistance and reactance variables of the loops, the input variables further including classifying signals describing the position of the resistance and reactance variables with respect to a starting characteristic of the starting arrangement;

applying to the trained neural network the resistance and reactance variables of the loops discrimination signals and a position of the resistance and reactance variables with respect to the starting characteristic for generating the fault classification signals.

* * * * *